_United States Patent_ [19]

Watanabe et al.

[11] 4,017,709

[45] Apr. 12, 1977

[54] ARC WELDING MACHINE

[75] Inventors: Toshihiko Watanabe, Kamakura; Tokuji Maruyama, Fujisawa, both of Japan

[73] Assignee: Kobe Steel Ltd., Kobe, Japan

[22] Filed: Feb. 13, 1975

[21] Appl. No.: 549,474

[30] Foreign Application Priority Data

| Mar. 1, 1974 | Japan | 49-25024[U] |
| Mar. 1, 1974 | Japan | 49-25025[U] |
| June 26, 1974 | Japan | 49-75927[U] |
| Feb. 13, 1974 | Japan | 49-18004 |
| Feb. 19, 1974 | Japan | 49-19683 |
| Mar. 3, 1974 | Japan | 49-25575 |
| Feb. 13, 1974 | Japan | 49-18005 |

[52] U.S. Cl. ............................... 219/126; 219/73 R; 219/123
[51] Int. Cl.² ............................................ B23K 9/08
[58] Field of Search .................. 219/73, 123, 125 R, 219/126

[56] References Cited

UNITED STATES PATENTS

| 2,152,194 | 3/1939 | Jones | 219/73 |
| 2,794,901 | 6/1957 | Christensen et al. | 219/126 |
| 3,204,082 | 8/1965 | Dudko et al. | 219/73 |
| 3,806,695 | 4/1974 | Carroll et al. | 219/126 |
| 3,854,028 | 12/1974 | Uttrachi et al. | 219/126 |

FOREIGN PATENTS OR APPLICATIONS

| 64,292 | 10/1968 | Germany | 219/73 |
| 436,867 | 3/1968 | Japan | 219/73 |

Primary Examiner—J. V. Truhe
Assistant Examiner—N. D. Herkamp
Attorney, Agent, or Firm—Oblon, Fisher, Spivak, McClelland & Maier

[57] ABSTRACT

An arc welding machine having a strap sliding to advance with advance of the welding position, wherein an electric conductor is disposed on the strap at a position not facing a welding groove with the electric conductor being insulated from the strap, and electric current being applied to the electric conductor while it is being cooled by water, to thereby control the arc direction.

9 Claims, 13 Drawing Figures

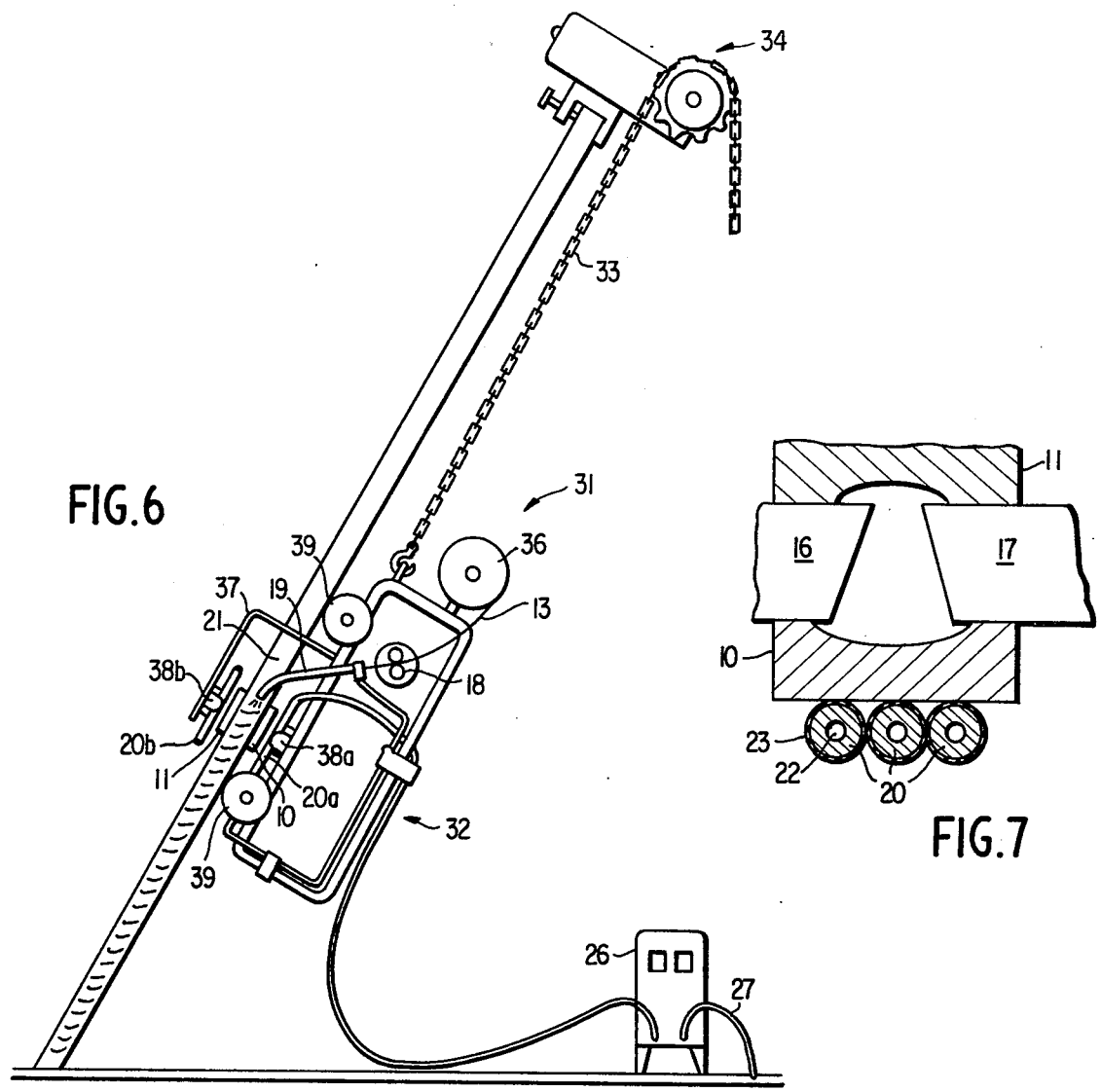
FIG.6
FIG.7
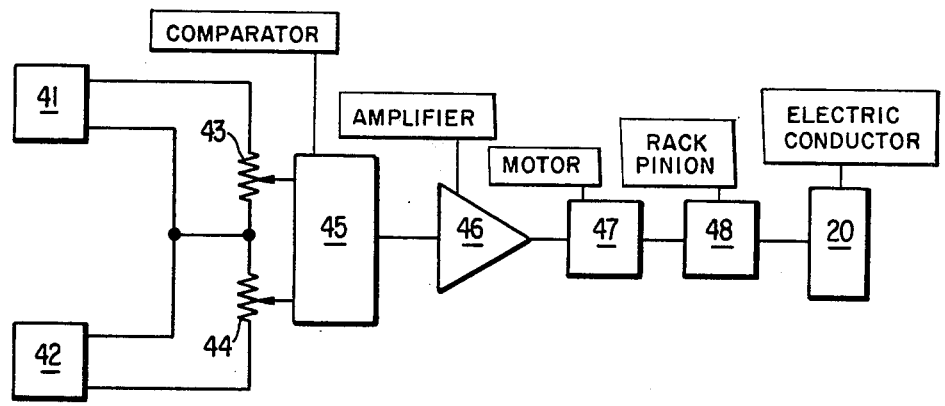
FIG.9

ARC WELDING MACHINE

BACKGROUND OF THE INVENTION

1. Field of the Invention:

This invention relates generally to an arc welding machine, and more particularly, to a welding machine having a strap sliding to advance with advance of the welding position wherein an electric conductor is disposed adjacent the strap at a position not facing a welding groove with the electric conductor being insulated from the strap, and electric current being applied to the electric conductor while it is being cooled by water, to thereby control the arc direction.

2. Description of the Prior Art:

This invention relates to an arc welding machine which has prominent effects especially when used for a type of welding commonly referred to as inclined position welding.

Inclined joints are applied to various structures, as for example in upward welding of outer side platings of a tanker. The total weld length of inclined upward joints is almost equal to the total weld length of vertical joints. Although the amount of welding for inclined joints is essentially equal to the amount of welding for vertical joints, no satisfactory welding method capable of providing good inclined joints has been developed in the art.

Welding of the inclined joints has heretofore been accomplished mainly by the electro-gas arc welding method. According to such electro-gas arc welding method, the groove face of a base metal to be welded is surrounded by a pair of front and back straps of copper cooled by water, a wire is continuously fed to a molten pool while a shield gas is being fed from above the molten pool to generate arcs between the top end of the wire and the molten pool, and the wire and base metal are melted by the heat of the arcs to thereby effect welding. Because of such process characteristics of this welding method, the applicable inclination angle is at most 15°, and at a larger inclination angle welding cannot be performed substantially automatically. Further, even at a smaller inclination angle, problems and disadvantages such as mentioned below are brought about and no joint portions of good weld conditions can be obtained according to this method.

Inclined joints are roughly divided into three types. In one type, the groove per se is in a vertical plane but the base metal is inclined, as shown in FIG. 1, and is so-called an overhead-inclined joint. In another type, the base metal per se is in a vertical plane but the groove is inclined, as shown in FIG. 3. In still another type, both the base metal and the groove are inclined.

In the welding of a so-called overhead inclined joint, as shown in FIG. 1, the surface area of a molten pool formed between straps 10 and 11 is larger when compared to the plate thickness. Accordingly, it is difficult to spread arcs over the entire surface. Furthermore, the incidence angle of a wire 13 to the molten pool is not rectangular but it is directed toward the back strap 11. As a result, the heat of the arcs is transferred mainly to the back side, and excessive penetration is caused on the back side to generate undercuts 14 on the back side as shown in FIG. 2, while overlaps 15 are formed or incomplete penetration is caused on the front side. More specifically, high temperature molten metal and slag flow toward the back side by the arcs directed toward the back side, and they wash the base metal on the back to thereby cause excessive penetration on the back side of the base metal, which is another cause of generation of undercuts. On the other hand, the high temperature molten metal or molten slag is not distributed to the front side, and therefore, incomplete penetration or overlap is caused. Furthermore, since the amount of slag is insufficient on the front side, the molten metal sometimes has a direct contact with the copper strap and the bead surface is roughened on the front side.

In the case of a so-called down hand inclined joint, the welding is conducted in a state contrary to the welding state in the case of the above-mentioned overhead joint, and defects are similarly caused.

In the case of a so-called three o'clock inclined joint, for the same reason as in the so-called down hand inclined joint, excessive penetration is caused on the upper base metal 16 to form undercuts 14 and incomplete penetration or overlap is caused on the lower base metal 17.

In the case of a combined joint including the above-mentioned so-called overhead inclined joint and so-called 3 o'clock inclined joint, the above causes are combined together and defects, as shown in FIG. 5, are brought about. More specifically, overlaps 15 are formed in the lower portion of the front side, and in other penetration portions of the base metal there are formed undercuts 14.

Even with a view to eliminating the above defects, if the wire-feeding position is let to approach the side (for example, the front side in the case of an overhead joint), similar defects are brought about because the direction of arcs is not changed. In the event the wire is fed such that the incidence angle of the wire is rectangular to the molten pool as indicated by imaginary lines in FIGS. 1 and 3, the above defects are reduced to some extent, but in this case applicable welding conditions are limited and further, the following problems are brought about.

In order to generate arcs vertical to the face of the molten pool, the wire should be fed so that it is not in parallel with the weld line but with a certain angle to the weld line (for example, when the inclination angle of the joint is 45°, the wire is fed in the state inclined at 45° to the weld line). If such feeding is performed in a narrow groove, an electricity-applying tip strikes on a base metal or copper strap, and therefore, practical application of this method is difficult. Furthermore, since the upper base metal 16 is molten and the melt is allowed to fall into the molten pool, a fresh surface is always exposed, and as this procedure is repeated, penetration is enlarged in the upper base metal 16. In contrast, in the case of the lower base metal 17 being molten, the melt covers the base metal and no fresh surface is exposed. Accordingly, incomplete penetration is caused.

Down hand butt welding is performed by various arc welding methods, but in many cases, the direction of generation of arcs is not in accord with the intended direction and defects such as incomplete penetration are sometimes brought about.

The foregoing defects may be overcome by disposing an electric conductor electrically insulated from a base metal in the vicinity of a weld groove and applying an electric current to the electric conductor during welding to control the inclination of the arc direction. However, since heat is generated while an electric current passes through the electric conductor, it is necessary to enlarge the sectional area of the electric conductor so as to reduce the current density.

In the case where an electric conductor composed of copper is continuously used for a long time, if a high electric current is applied, it is necessary to drastically increase the sectional area of the electric conductor. If the sectional area of the electricity is too large or a plurality of electric conductors are disposed, it becomes impossible to allow the electric conductor to approach the arc-generating position, and hence, it is impossible to effectively control the inclination of the arc direction.

SUMMARY OF THE INVENTION

It is therefore a primary object of this invention to provide an arc welding machine in which the inclination of the arc direction can be effectively controlled.

A further object of this invention is to provide an arc welding machine capable of providing welded portions free of such weld defects as undercuts and overlaps.

In accordance with a first aspect of this invention for attaining the foregoing and other objects, there is provided an arc welding machine having a strap sliding to advance with advance of the welding position, wherein an electric conductor is disposed on the strap at a position not facing a welding groove with the electric conductor insulated from the strap, and electric current being applied to the electric conductor while it is being cooled by water.

In accordance with a second aspect of this invention, there is provided an arc welding machine as set forth in the first aspect, wherein the welding current is passed through the electric conductor.

In accordance with a third aspect of this invention, there is provided an arc welding machine as set forth in the first aspect, wherein the electric conductor is disposed such that the relative position of the electric conductor to the arc and/or the direction of the electric conductor to the arc direction can be adjusted.

In accordance with a fourth aspect of this invention, there is provided an arc welding machine as set forth in the first aspect, wherein a detecting member is provided to detect the temperature of the cooling water from the front strap and cooling water from the back strap and the relative position of the electric conductor to the arc and/or direction of the electric conductor to the arc direction can be adjusted in response to the values detected by the detecting member.

In accordance with a fifth aspect of this invention, there is provided an arc welding machine as set forth in the first aspect, wherein a detecting member is provided to detect the inclination angle of the weld line and the relative position of the electric conductor to the arc and/or the direction of the electric conductor to the arc direction can be adjusted in response to the values detected by the detecting member.

In accordance with a sixth aspect of this invention, there is provided an arc welding machine as set forth in the first aspect, wherein the strap has a recess for receiving therein the electric conductor, at a part not facing the welding groove.

In accordance with a seventh aspect of this invention, there is provided an arc welding machine as set forth in the first aspect, wherein a magnetic body is mounted on the electric conductor on the side not facing the strap.

In accordance with an eighth aspect of this invention, there is provided an arc welding machine as set forth in the first aspect, wherein a magnetic body having a concave shape is mounted on the electric conductor on the side not facing the strap.

BRIEF DESCRIPTION OF THE DRAWINGS

Other objects, features and attendant advantages of the present invention will be more fully appreciated as the same becomes better understood from the following detailed description when considered in connection with the accompanying drawings, wherein:

FIG. 6 is a view illustrating an embodiment of the welding machine of this invention;

FIG. 7 is a sectional view illustrating the positional relationship among the electric conductor, strap and base metal in the welding machine of this invention;

FIG. 9 is a diagram showing the mechanism for adjusting the position of the electric conductor in the welding machine of this invention;

DETAILED DESCRIPTION OF THE PREFERRED EMBODIMENTS

Figure 1:
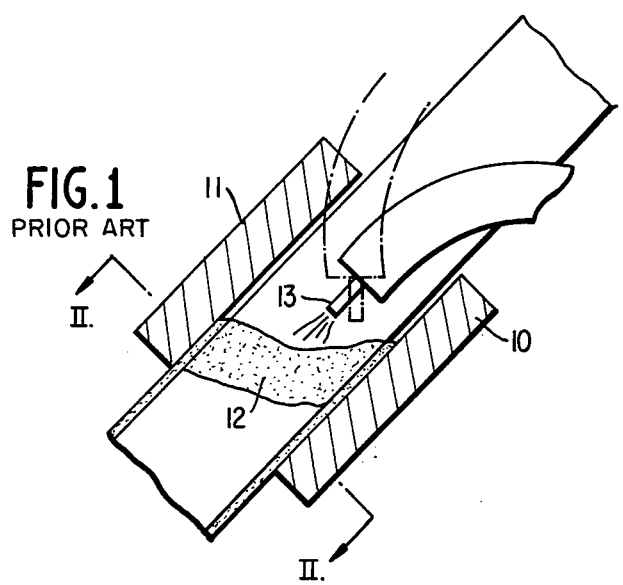
FIG. 1 is a view illustrating the conventional welding method of welding a so-called overhead inclined joint, which is viewed from the direction parallel to base metal.
Figure 2:
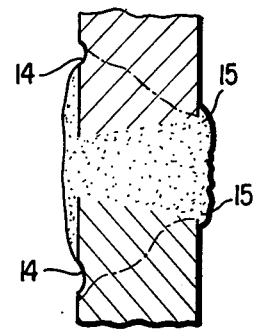
FIG. 2 is a view illustrating the section taken along the line II—II of FIG. 1.

In the arc welding machine of this invention, a force according to the left-hand law of Fleming is imposed on the arc by passing an electric current in an electric conductor, and the arc is inclined by utilizing the characteristic property of an arc that is directed to the area or point where the density of the magnetic force line is low. Accordingly, the electric conductor may be disposed at either the front side or the back side of the base metal. Furthermore, it is permissible to dispose electric conductors at both the front and back sides of the base metal. It is also possible to dispose the electric conductor such that it bridges both sides of the weld line at the center of the weld line on one side face of the base metal or that it deviates toward the area where incomplete penetration or excessive penetration is readily caused. If the electric conductor is disposed in the position substantially rectangular to the weld line, the arc can be inclined in the direction rectangular to the inclination direction of the arc attained when the electric conductor is disposed in parallel with the weld line.

The welding current can be used as an electric current to be passed in the electric conductor. Alternatively, an independent electric current may be passed in the electric conductor separately from the welding current. As is obvious to those skilled in the art, the electric current to be applied to the electric conductor may be either a direct current or an alternating current.

In the case where down hand welding is performed according to the submerged arc welding method or the MIG welding method, if the electric current to be applied to the electric conductor is changed, it is made possible to weave the arc.

Embodiments of this invention will now be illustrated in detail by reference to the accompanying drawings.

FIG. 6 illustrates the automatic arc welding machine 31 of this invention for welding overhead joints. This welding machine 31 includes a welding truck 32 mounted on the front side of a weld groove, a truck lift 34 for elevating and lowering the truck 32 by means of chain 33, and a welding electric source 26 connected to ground through a cable 27.

In the welding truck 32, there are disposed an electricity applying nozzle 19, a wire reel 36, a wire feed motor 18 for feeding a wire 13, straps 10 and 11 capable of rising while sliding on the front and back of the arc position, and electric conductors 20a and 20b positioned at the straps at positions not facing the welding groove wherein the electric conductors 20a and 20b are electrically insulated from the straps. The welding truck 32 is allowed to ascend and descend on the side face of the base metal to be welded by means of a plurality of magnetic rollers 39.

The back electric conductor 20b is attached to the welding truck 32 through a connecting rod 37, and both the electric conductors 20a and 20b are supported on the welding truck 32 and the connecting rod 37, respectively, through fittings 38a and 38b. In the embodiment shown in FIG. 6, the electric conductor 20a is connected to the welding electric source 26 and the electricity applying nozzle 19. Needless to say, the electric conductor may be connected to an independent electric source different from the welding electric source. Fittings 38a and 38b are composed of an insulating material and it is preferred that their positions can be adjusted vertically with respect to the welding truck, that they can be freely rotated and that their distances from the straps can be freely controlled.

In FIG. 6, a device for feeding cooling water to the electric conductors 20a and 20b is not shown. When a material having a large inclination angle is welded, it is necessary to sufficiently deflect the arc. In order to deflect the arc effectively, it is necessary to make the electric conductor approach the arc as much as possible, and to apply a high electric current and increase the number of electric conductors to be disposed. In this case, each electric conductor 20 is electrically insulated from the other electric conductors and the straps 10 and 11 by means of an insulating material 23 and a cooling water passage 22 penetrates the central portion of each electric conductor 20. If cooling water is fed to passage 22, it is then possible to pass a high electric current through the electric conductor without enlarging the sectional area thereof, and as a result, the electric conductor can be made to approach the arc.

In the case of the so-called overhead inclined welding of 30° with respect to the vertical line, the total electric current passed through one or more electric conductors should be at least 1500 A. If sufficient inclination of the arc direction is to be accomplished by using three electric conductors through which no cooling water is passed, it is necessary to apply an electric current of at least 500 A to each of the electric conductors. Therefore, the sectional area should be increased in each electric conductor. If the section area is too small, the electric conductor cannot be used for a long time and further, the insulating material for insulating it electrically is drastically degraded, thus lowering the durability of the machine as a whole. Furthermore, since it is not permissible to make the electric conductor approach the arc if its sectional area is too large, the effect of deflecting the arc is correspondingly reduced, and if it is intended to attain a sufficient effect of deflecting the arc, a much larger electric current should be applied, which is not preferred from an economical viewpoint. In addition, in such case, the weight and space of the electric conductor inevitably increases and its handling becomes difficult. In an extreme case, such electric conductor cannot be used practically for the reason that insufficient space for the electric conductor is provided. In contrast, if the electric conductor is cooled with water, its volume or size can be reduced and it is made possible to allow it to approach the arc-generating point to such an extent that sufficient inclination of the arc direction can easily be attained. In the event a total electric current of 1500 A is required, as in the above-mentioned case of electric conductors of the non-water-cooling type, when three electric condcctors of the water-cooling type are employed, the sectional area of each electric conductor through which an electric current of 500 A is passed can be made much smaller than the sectional area of the electric conductor of the non-water-cooling type. For example, even when the inclination angle of the weld line is 45°, a sufficient inclination of the arc direction can be accomplished, and if the inclination angle of the weld line is 30°, a sufficient inclination of the arc direction can be attained by passing a total electric current of 900 A, namely an electric current of 300 A through each of the three electric conductors. In this case, the sectional area of the electric conductor may be ¼ to 1/10 of the sectional area required of the electric conductor of the non-water-cooling type. Moreover, it has been confirmed that other defects observed when electric conductors of the non-water-cooling type are employed can be eliminated by using electric conductors of the water-cooling type.

It is now added that if electric conductors, through each of which 2A can flow, are used in the above case, it is necessary to dispose 750 electric conductors and though the weight of one electric conductor can be reduced, a large space is required for such a great number of electric conductors and that in such case a sufficient effect cannot be attained by electric conductors of the non-water-cooling type and the machine as a whole cannot be put into practical use. Moreover, when the welding electric source is used also as the electric source for the electric conductors, since a high electric current of 600 A or higher is generally used at the present because of maintenance of a high welding efficiency, use of electric conductors of the water-cooling type is indispensable. In view of the equipment cost, electric power consumption and the like, the welding method where the welding electric source is used as an electric source for applying an electric current to the electric conductors is advantageous over the welding method where an independent electric source is provided for the electric conductors separately from the welding electric source.

Figure 8:
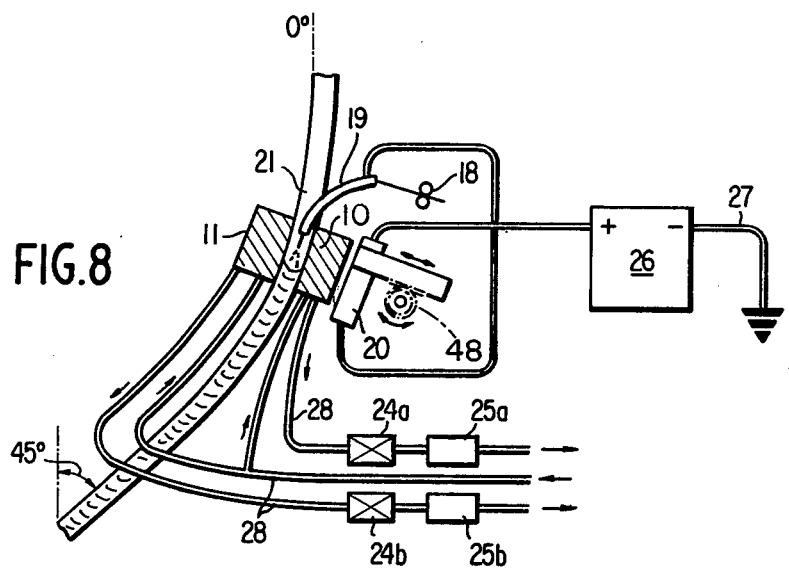
FIG. 8 is a view illustrating another embodiment of the welding machine of this invention.

Some joints to be welded, for example, curved joints of outer side platings of ships, have an inclination angle which is not constant but is changed. In the case of such a curved joint having an inclination angle changed continuously from 45° to 0° (vertical) as shown in FIG. 8, the position of the electric condctor should be changed relative to the arc position. More specifically, the attachment position and/or attachment angle of the electric conductor is changed to thereby change the force of the electric current passing through the electric conductor on the arc and/or the direction of this force, with the result that the intensity of inclination of the arc and/or the direction of inclination of the arc can be controlled such that penetration can be kept constant regardless of the change in the welding conditions caused by the change in the inclination angle of the joint. The temperature of cooling water is detected on the cooling water discharge side with respect to both the front and back copper straps 10 and 11 by means of cooling water temperature-detecting members 24a and 24b, as shown in FIG. 8, and the position of the electric conductors 20a and 20b is changed so that the difference between the detected temperatures or the ratio of the detected temperatures is kept constant, whereby the intensity of deflection of the arc is controlled and penetration is kept constant. The penetration is concerned with heat inputs to both the front and back straps, and in general, a large heat input results in a larger penetration. It is sometimes preferred that one of the heat inputs to the front and back straps be larger than the other heat input. In such case, good results are obtained when the position of the electric conductors 20a and 20b is so adjusted that the difference between the heat inputs to both the straps is kept constant or the ratio of the heat inputs to both the straps is kept constant.

Heat inputs (Q) are represented as follows:
$Q_1$ (front side) = $l_1$ ($T_1 - T_{01}$) cal/sec, and
$Q_2$ (back side) = $l_2$ ($T_2 - T_{02}$) cal/sec
wherein $Q_1$ and $Q_2$ stand for heat inputs to the front and back straps, respectively, $l_1$ and $l_2$ (cc/sec) stand for amounts of cooling water fed to the front and back straps, respectively, $T_1$ and $T_2$ (° C) stand for temperatures of cooling water discharged from the front and back straps, and $T_{01}$ and $T_{02}$ stand for temperatures of cooling water fed to the front and back straps, respectively.

If the relation of $l_1 = l_2$ is established by cooling water flow adjusters 25a and 25b attached to the front and back straps, respectively, and if cooling water is fed from the same inlet to both the front and back straps, since $T_{01}$ is equal to $T_{02}$, the following relation is established:

$Q_1 - Q_2 = l (T_1 - T_2)$

If $l$ is constant, the relation of $(Q_1 - Q_2) \propto (T_1 - T_2)$ is established. Accordingly, the difference of the temperatures $T_1$ and $T_2$ can be regarded as the difference of the heat inputs $Q_1$ and $Q_2$. Further, also in the case of the ratio of the heat inputs, since the relation of $Q_1/Q_2 = T_1/T_2$ is established, said ratio can be determined only by measuring the temperatures $T_1$ and $T_2$.

In the welding machine of the present invention, as is apparent from the foregoing illustration, the position of the electric conductor is adjusted so that the difference between the temperatures of cooling water discharged from the front and back straps or the ratio of said temperatures is kept constant. An instance of the mechanism for embodying this feature is shown in FIG. 9. The temperatures of cooling water discharged from the front and back straps are detected by thermocouples 41 and 42 disposed in discharge water pipes of the front and back straps, respectively, and the temperatures are adjusted to appropriate values in response to signals by the thermocouples by means of potentiometers 43 and 44. A comparator 45 to be actuated in response to the difference between both the values is disposed downstream, and a signal by the comparator 45 is amplified by an amplifier 46 and a motor 47 is driven in response to the amplified signal to move the electric conductor 20 by a rack pinion 48.

Of course, the above adjustment of the position of the electric conductor can be accomplished more simply by using mercury thermometers and moving the electric conductor in response to the read values.

Figure 10:
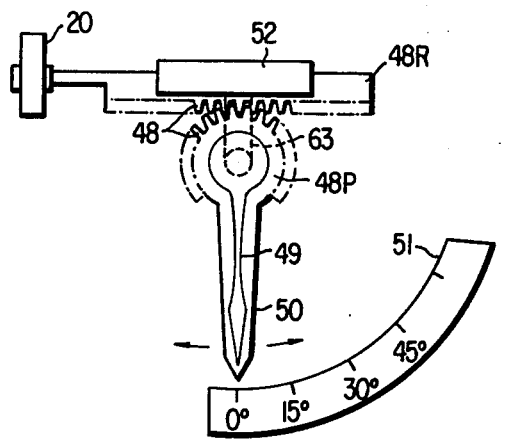
FIG. 10 is a view illustrating the detecting member for detecting the inclination angle of the weld line in the welding machine of this invention.

FIG. 10 is a diagram illustrating a mechanism for adjusting the position of the electric conductor in correspondence to the inclination angle of the weld line. A rack 48r is movably mounted in a guide 52 fixed to the truck frame, and an electric conductor 20 is fixed to the rack. A pinion 48p driving the rack 48r is disposed integrally with a lever 50, and the rotary shaft of the pinion 48p is fixed to an arm 63 extending from the guide 52, such that the pinion provided with the lever and an angle-indicating needle 49 can be rotated independently about the rotary shaft. The angle-indicating needle 49 rotates in response to the inclination angle changed with the shift of the truck moving with advancement of the welding position and it indicates the inclination angle on an angle dial 51. The angle-indicating needle 49 is rotated so that the top end of the needle 49 points in the direction of gravity (the downward direction). The pinion 48p is provided with the lever 50 which is made in agreement with the angle indicated by the angle-indicating needle 49 by operating the lever 50. By adoption of the above-mentioned mechanism, the electric conductor can easily be set at a position optimum to the inclination angle.

The above mechanical functions can be automated by adoption of a suitable servo-mechanism.

Figure 3:
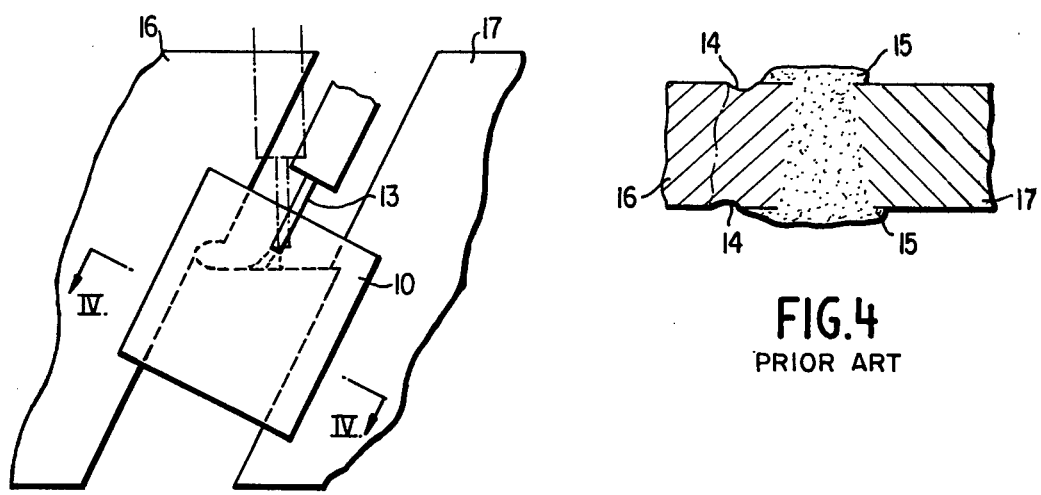
FIG. 3 is a view illustrating the conventional welding method of welding a so-called three o'clock inclined joint, which is viewed from the direction vertical to base metal.
Figure 4:
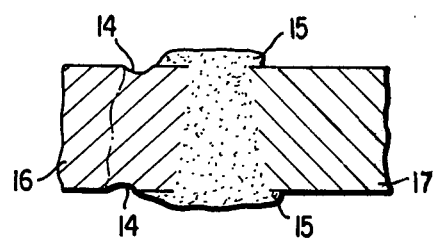
FIG. 4 is a view illustrating the section taken along the line IV—IV of FIG. 3.
Figure 5:
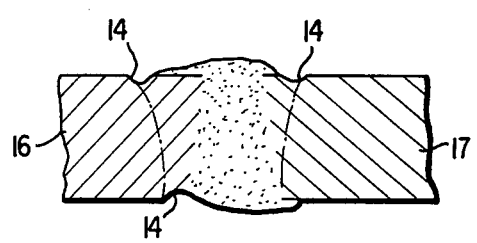
FIG. 5 is a sectional view illustrating the conventional welding method of welding a composite joint.

Overhead welding has been illustrated in the foregoing embodiments, but as is obvious to those skilled in the art, so called three o'clock inclined joints as shown in FIG. 3 can similarly be welded in the foregoing embodiments. In the case of 3 o'clock welding, it is necessary to incline the arc toward the base metal 17, but this is readily accomplished by fixing the electric conductor so that the angle to the weld line is 90°, though the electric conductor is rotatably disposed.

Figure 11:
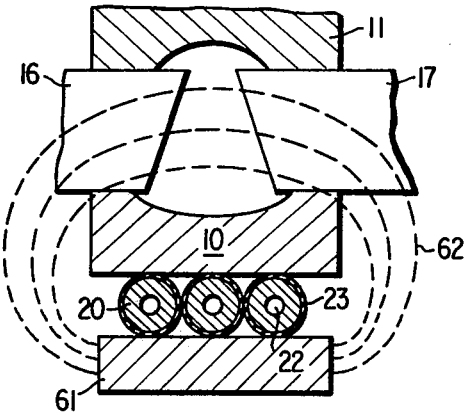
FIG. 11 is a view illustrating an example of the magnetic body disposed in the welding machine of this invention.
Figure 12:
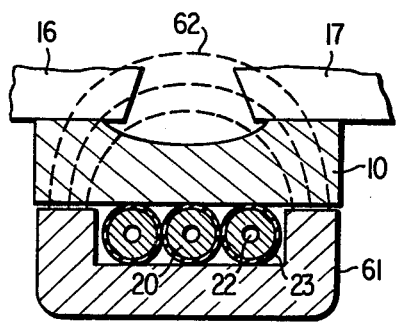
FIG. 12 is a view illustrating another example of the magnetic body disposed in the welding machine of this invention.

Each of FIGS. 11 and 12 is a sectional view showing the welding zone where a magnetic body is used. A magnetic substance, for example, a mild steel or silicon steel plate, has a specific permeability 500 to 1000 times as high as a non-magnetic substance such as air or copper. When a magnetic body 61 is disposed on the electric conductor 20 on the side not facing the strap 10, the flux density is increased at the arc, and the deflection of the arc is similarly increased, such that the magnetic force line 62 is effectively directed to the arc. Accordingly, if the magnetic body 61 is disposed in the above-mentioned manner, a larger deflection of the arc can be obtained with a lower electric current than in the case where no magnetic body is disposed. Therefore, in this embodiment, an economical advantage can be attained, and since the sectional area of the electric conductor can be reduced, the space for the electric conductor can be made smaller and handling can be facilitated. Furthermore, if a concavity of U-shaped recess is formed on the outer periphery of the magnetic body as shown in FIG. 12, the effects mentioned above with respect to FIG. 11, can be enhanced. More specifically, the density of the magnetic force line 62 emitted from one end of the magnetic body 61 is heightened at the arc and the direction or passing position of the magnetic force line can be appropriately controlled by the shape of the magnetic body.

Figure 13:
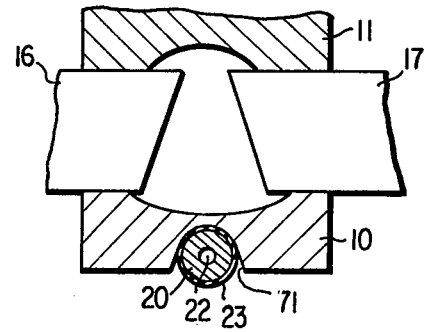
FIG. 13 is a view illustrating still another embodiment of this invention.

As shown in FIG. 13, a strap 10 may have a recess 71 for receiving therein an electric conductor 20, at a point not facing the groove, a plurality of electric conductors can be used.

As is apparent from the foregoing illustration, in the welding machine of this invention, inclination of the direction of the arc can be effectively controlled, and therefore, penetrations free of such defects as undercuts and overlaps can be obtained stably.

Obviously, many modifications and variations of this invention are possible in light of these teachings. It is to be understood therefore that within the scope of the appended claims, the present invention may be practiced otherwise than as specifically described herein.

What is claimed as new and intended to be covered by letters patent is:

1. An arc welding machine for welding together two members defining a welding groove therebetween, comprising:
    strap means adapted to be disposed adjacent said two members and said welding groove;
    an electric conductor movably disposed adjacent to said strap and upon the side of said strap means opposite that wherein said welding groove is disposed, said electric conductor being electrically insulated from said strap means;
    means for generating an arc within the vicinity of said welding groove;
    means for applying an electric current to said electric conductor so as to generate a magnetic field for affecting the direction of said arc; and
    means for cooling said electric conductor characterized in that a cooling water passage is disposed centrally of said conductor whereby a high electric current can pass through said electric conductor without enlarging the sectional area thereof so as to facilitate the approach of said electric conductor toward said welding arc so as to affect the same.

2. An arc welding machine as set forth in claim 1, wherein the welding current is passed through said electric conductor.

3. An arc welding machine as set forth in claim 1, further comprising:
    means for adjusting the relative position of the electric conductor with respect to the arc and/or the direction of the electric conductor with respect to the arc direction.

4. An arc welding machine as set forth in claim 1, wherein said strap means comprises a front strap and a back strap.

5. An arc welding machine as set forth in claim 4, further comprising:
    a detecting member for detecting the temperature of the cooling water from said front strap and cooling water from the back strap, and
    means for adjusting the relative position of said electric conductor with respect to the arc and/or the direction of the electric conductor with respect to the arc direction in response to the values detected by said detecting member.

6. An arc welding machine as set forth in claim 1, wherein said machine further comprises:
    an indicating means provided for indicating the inclination angle of the weld line,
    whereby the relative position of the electric conductor to the arc and/or the direction of the electric conductor to the arc direction is adjusted in response to the values indicated by said indicating means.

7. An arc welding machine as set forth in claim 1 wherein said strap means has a recess for receiving therein the electric conductor, at a position not facing the welding groove.

8. An arc welding machine as set forth in claim 1 wherein a magnetic body is mounted on the electric conductor on the side not facing the strap means.

9. An arc welding machine as set forth in claim 1, wherein a magnetic body having a concave shape is mounted on said electric conductor on the side not facing said strap.

* * * * *